United States Patent

[11] 3,613,044

| [72] | Inventor | Willis G. Rarick<br>New Paris, Ind. |
|---|---|---|
| [21] | Appl. No. | 884,300 |
| [22] | Filed | Dec. 11, 1969 |
| [45] | Patented | Oct. 12, 1971 |
| [73] | Assignee | Lyall Electric, Inc.<br>Albion, Ind. |

[54] POWER SUPPLY CORD HATCH
4 Claims, 4 Drawing Figs.

[52] U.S. Cl. ............................................. 339/44 R, 174/67
[51] Int. Cl. ............................................. H01r 13/44
[50] Field of Search ............................................. 339/36, 43, 44, 119, 147; 174/67; 191/12, 12.4

[56] References Cited
UNITED STATES PATENTS

| 1,366,246 | 1/1921 | Cooper | 339/44 R |
| 2,304,870 | 12/1942 | Yost | 339/44 R |
| 2,880,264 | 3/1959 | Ruskin | 339/44 R |
| 2,934,591 | 4/1960 | Tiikkainen | 174/67 |

*Primary Examiner*—Joseph H. McGlynn
*Attorney*—Jeffers & Rickert

ABSTRACT: An improved hatch for a power supply cord to be used on travel trailers and similar structures wherein it is desired to store within the structure a power supply cord and, from time to time, extract that cord and connect it to a source of electrical current is disclosed. The latch is fabricated in two pieces from nylon or other thermoplastic material and designed to be moisture resistant. A novely configured rear portion of the hatch is designed to flexibly pass an electrical plug during assembly and to pass (without flexing) the power cord during use.

PATENTED OCT 12 1971
3,613,044
SHEET 1 OF 2
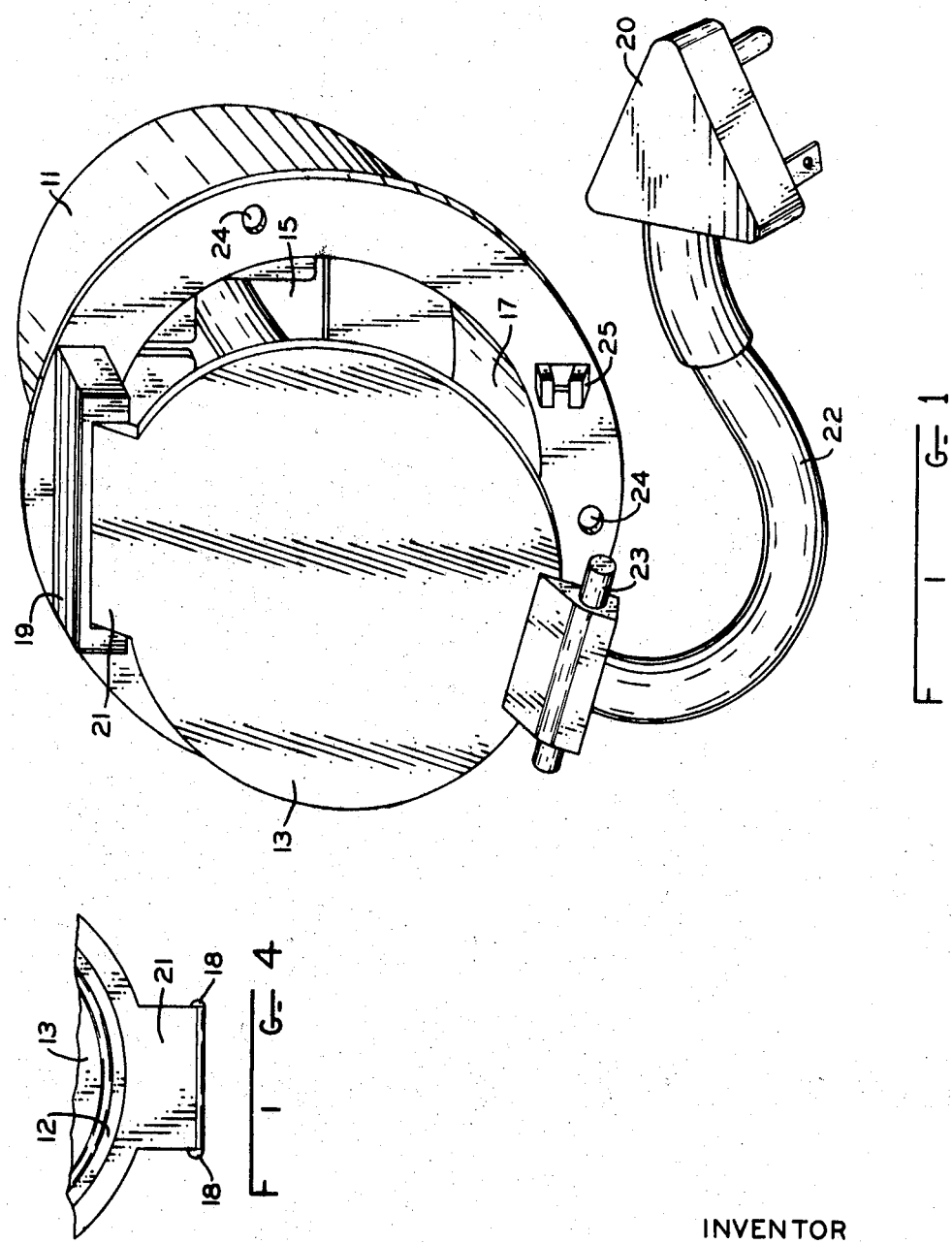
INVENTOR
WILLIS G. RARICK
BY Jeffers and Young

PATENTED OCT 12 1971 3,613,044

INVENTOR
WILLIS G. RARICK
BY Jeffers and Young
ATTORNEYS

3,613,044

POWER SUPPLY CORD HATCH

BACKGROUND OF THE INVENTION

This invention relates to a hatch for passing a power supply cord from a travel trailer or similar structure which is suitable to store and seal against moisture the power supply cord and plug when the travel trailer is in transit. Such hatches are presently being used on travel trailers and the like but suffer from numerous rather substantially defects. Present day hatches are fabricated of metals and are subject to rust and corrosion. The presently used hatches have a lid or cover portion which serves to seal the hatch against moisture which is spring loaded toward its closed position. There are, of course, the normal drawbacks to such a spring loading of expense and maintenance and additionally such spring-loaded hatch arrangements are awkward in operation. These hatches typically consist of a front lid or cover portion, a recess portion which serves to hold the electrical plug and a rear partition which has an aperture therein of a size to pass the multiconductor cable but not large enough to pass the plug. Hence in use, the plug is contained within the recess portion and the cable is stored behind the partition. To hook the trailer up to the source of electrical energy, the hatch is lifted and the cable pulled out through the aperture in the rear partition. Another drawback of the prior art hatches is that the sequence of assembly is awkward and time consuming. In constructing the travel trailer, the cable is first attached to electrical terminals within the trailer then the cable must be passed through the aperture in the hatch then a plug must be attached to the other end of the cable and the hatch fastened to the wall of the trailer. An alternate method of assembling the prior art hatch and cable combination is to feed typically 25 feet of cable through the aperture and attach the one end to the terminals within the trailer using a cable with an already affixed plug. This process of feeding the cable through the aperture is obviously time consuming. Much faster assembly could be achieved if the plug end of the cable with the plug already attached could be simply passed through the rear aperture in the hatch, however, in those circumstances the plug end might drop out of the recess portion of the hatch and become lost to the travel trailer user.

SUMMARY OF THE INVENTION

The above-noted prior art defects are overcome in the present invention by providing a relatively simple two-piece hatch fabricated of nylon or other thermoplastic material and adapted for easy and rapid assembly. One piece of the hatch defines a recess of generally right circular cylindrical configuration, one end of the cylinder being adapted to be closed by the second portion of the hatch which is the lid or cover and the other end of the cylinder being a partition with a unique aperture therein which will deformably pass the plug and yet readily allow the cable to be pulled through without deformation. This recess defining portion also has one-half of a hinge for attaching the cover portion and has enclasping means which are adapted to encompass a corresponding protrusion on the cover and act to securely hold the cover in its closed position. The cover has a pair of rather short pins which may be deformably inserted in the hinge portion of the other piece and is additionally provided with a pair of protrusions which mate with the enclasping portion when the cover is closed.

Accordingly, it is one object of the present invention to provide a power supply cord hatch which is not subject to corrosion.

It is another object of the present invention to provide a power supply cord hatch which allows easier assembly of the cord, hatch and plug.

It is a further object of the present invention to provide a power supply cord hatch characterized by its simplicity of assembly.

It is still further object of the present invention to provide an economical power supply cord hatch.

It is yet another object of the present invention to provide a method of assembling a power supply cord, hatch and plug.

It is a still further object of the present invention to provide a power supply cord hatch characterized by its unique cord and plug passing aperture.

Another object of the present invention is to provide a nylon or other thermoplastic power supply cord hatch having unique hinge and latching mechanisms.

BRIEF DESCRIPTION OF THE DRAWING

These and other objects and advantages of the present invention will appear more clearly to those of ordinary skill in the art from the following detailed disclosure read in conjunction with the drawing in which:

FIG. 1 shows a perspective view of the two portions of the hatch of the present invention;

FIG. 4 is a partial plan view of the inside side of the cover portion and the hinge.

DETAILED DESCRIPTION OF THE PREFERRED EMBODIMENT

Figure 3:
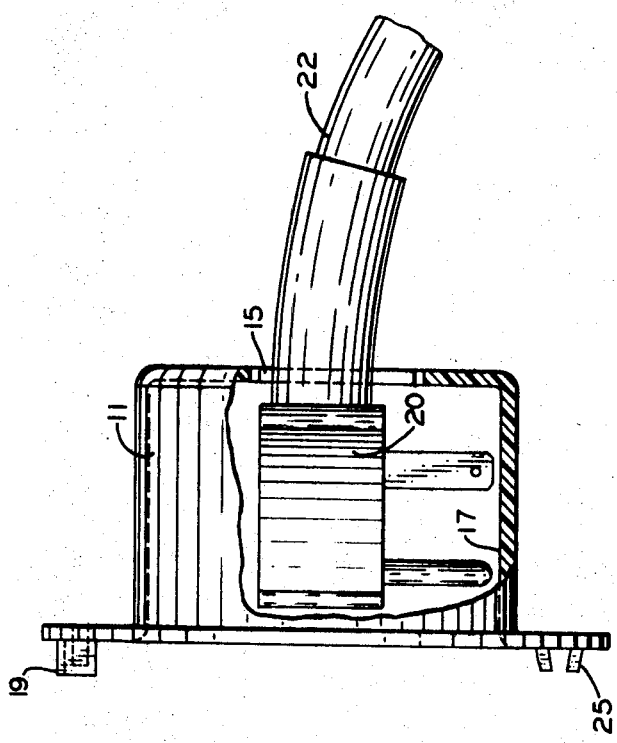
FIG. 3 is a partly cutaway side view of the recess defining portion of the hatch showing a power supply cord and plug in its stored position.

An overall understanding of the present invention may be most easily derived from FIG. 1 which shows the hatch as consisting of two portions, a recess-defining portion 11 and a cover portion 13. The recess-defining portion 11 has a first opening 15, the configuration of which is most readily seen in FIG. 2, which is adapted to deformably pass an electric plug 20 and to pass the multiconductor electrical cable 22 without deformation. The hatch of the present invention is to be mounted in a wall using the mounting holes 24 and its anticipated environment is that of a travel trailer although other uses will be obvious once its basic nature is understood. The cover portion 13 is attached to the recess defining portion 11 by means of a hinge 19 and 21 the two portions of which are joined by deforming slightly the first portion of the hinge 19. The cover 13 is held in its closed position when the protruding portion 23 is snapped in place or encompassed by the enclasping means 25 which is fixedly attached to the recess defining portion 11. The cover 13 may be closed only when the multiconductor cable 22 has been pushed back through the rear opening and the plug 20 is encased within the recess of the recess defining portion 11. The cover 13 is also provided with a stepped portion 12 so as to be recessed into the right circular cylindrical recess of the recess defining portion 11 when the cover is snapped shut. As more clearly seen in FIGS. 2 and 3 this recess is configured in a right circular cylindrical form although other configurations are possible.

Figure 2:
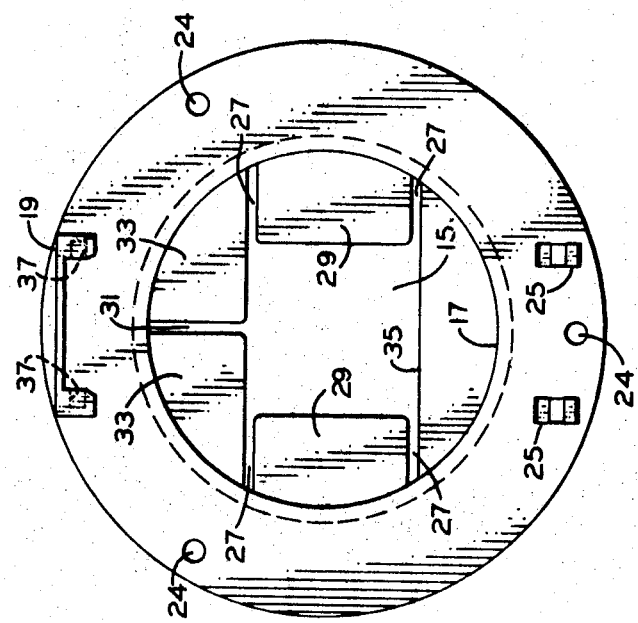
FIG. 2 shows a front view of the recess defining portion of the hatch.

Turning now to FIG. 2, this rear aperture or first opening 15 is seen to have a generally rectangular configuration which is extended by slits 27 which are parallel to two opposite sides of the rectangle and which serve to form two flaps 29 which are deformed or displaced when the plug 20 is forced through the opening 15 and yet are not deformed when the cable 22 passes through the rectangular opening. This opening is additionally provided with another slit 31 perpendicular to the aforementioned opposite sides which serves to define two additional flap portions 33 which are also deformed when passing the plug 20.

The entire hatch structure of the present invention is fabricated from nylon or some other thermoplastic material which is a semirigid material and has the dual advantage of being corrosion resistant and being somewhat flexible which facilitates both assembly and use of the present invention. It should be also noted in FIG. 2 that the lowermost position 35 of the rear aperture 15 is substantially above the lowest portion of the cylindrical recess. This has the very substantial advantage of preventing water from flowing back into the cylindrical recess and through the rear aperture into the sidewalls of the travel trailer.

THe hinge portion 19 has two cylindrically configured holes 37 which are adapted to accept corresponding short pins 18 on the hinge portion 21 of the cover 13. These pins are illustrated in FIG. 4. Thus by slightly deforming the hinge portion 19, the cover may be inserted and firmly held in position. The enclasping portions 25 which serve to hold the cover in its closed position are most readily seen in FIG. 3 and are configured so that the distance between the two prongs at their closest point is less than the diameter of the protruding portion 23 on the cover so that these prongs or enclasping portion 25 must be deformed to accept the pin 23. As the pin is pushed in further along these enclasping portions it is securely held there and serves to keep the cover from opening. FIG. 3 also illustrates how the plug 20 is nested within the recess defining portion 11 for example during transit of the travel trailer.

THe method of assembling the present hatch and corresponding power supply cord should now be clear. A multiconductor cable is provided and one end of the cable is attached to fixed electrical terminals within the trailer. The other end of the cable is attached to a plug 20 and this plug is then passed through the first opening 15 by deforming sidewise the flaps 29 and deforming upwardly and outwardly the flaps 33. Once the plug has been passed through this first opening the flaps return to their normal position and freely allow the multiconductor cable 22 to be slid in and out. In this manner there is no need to fish the entire length (usually 25 feet) of cable through the back opening in the hatch during the assembly process.

Thus while the present invention has been described with respect to a specific embodiment numerous modifications will suggest themselves to one of ordinary skill in the art having the present disclosure before him and the scope of the present invention is to be measured only by that of the appended claims.

I claim:

1. The method of assembling a power supply cord and hatch wherein the hatch comprises a recess defining portion having a first opening adapted to deformably pass the plug and a second opening, and a cover portion, said cover portion adapted to close said second opening comprising the steps of:
   providing a multiconductor cable of a predetermined length with a plug affixed to one end;
   attaching the other end of the cable to fixed electrical terminals;
   deforming said first opening and passing said plug and attached cable therethrough;
   closing said cover portion if it is not already closed so as to encase said plug within said recess with said cable extending through said first opening;
   opening said cover portion; and
   withdrawing said plug and attached cable sufficiently to allow engagement of said plug and a receptacle whereby said cable now passes through both said first and second openings.

2. A power supply cord hatch to be used in conjunction with a multiconductor cable having a plug attached thereto and comprising:
   a plug recess defining portion having first and second opposite ends, said first end formed of a semirigid material and having a first opening which will deformably pass said plug and further slidably pass said multiconductor cable without substantial deformation, said second end having a second opening;
   a cover portion adapted to close at least part of said second opening to prevent passage of said plug through said second opening;
   hinge means, a first portion of which is permanently affixed to said recess defining portion and a second portion of which is permanently affixed to said cover portion near one edge thereof, said first and second portions being joinable to form a hinge whereby said plug many be placed within said recess with said cover closed and with said semiconductor cable extending through said first opening and subsequently said cover may be hingably opened and said plug withdrawn from said recess and said multiconductor cable slid through said first opening and extended from said hatch a preferred length for attachment of said plug to a receptacle.

3. The hatch of claim 2 wherein the plug recess defining portion defines a recess of a right circular cylindrical configuration, said first opening being located in one end of the cylinder and said second opening being the entire other end of said cylinder.

4. The hatch of claim 2 further comprising means for maintaining said cover portion in its end closing position.

PO-1050
(5/69)

UNITED STATES PATENT OFFICE
CERTIFICATE OF CORRECTION

Patent No. 3,613,044   Dated October 12, 1971

Inventor(s) Willis G. Rarick

It is certified that error appears in the above-identified patent and that said Letters Patent are hereby corrected as shown below:

Abstract of the Disclosure, line 5, "latch" should be --- hatch --- .

Column 4, line 29 (Claim 2) "many" should be --- may --- .

Column 4, line 31 (Claim 2) "semiconductor" should be --- multiconductor --- .

Signed and sealed this 22nd day of February 1972.

(SEAL)
Attest:

EDWARD M. FLETCHER, JR.        ROBERT GOTTSCHALK
Attesting Officer              Commissioner of Patents